United States Patent [19]

Hannecart

[11] Patent Number: 4,898,906

[45] Date of Patent: Feb. 6, 1990

[54] COMPOSITIONS BASED ON VINYLIDENE FLUORIDE POLYMERS WHICH HAVE A REDUCED SMOKE-GENERATING CAPACITY

[75] Inventor: Etienne Hannecart, Tervueren, Belgium

[73] Assignee: Solvay & Cie, Brussels, Belgium

[21] Appl. No.: 91,309

[22] Filed: Aug. 28, 1987

Related U.S. Application Data

[63] Continuation of Ser. No. 539,063, Oct. 4, 1983, abandoned.

[30] Foreign Application Priority Data

Oct. 11, 1982 [FR] France .................................. 82 17123

[51] Int. Cl.$^4$ ................................................ C08K 3/24
[52] U.S. Cl. ........................................................ 524/406
[58] Field of Search ......................................... 524/406

[56] References Cited

U.S. PATENT DOCUMENTS

| | | | |
|---|---|---|---|
| 3,582,518 | 6/1971 | Lyons | 524/406 |
| 3,821,151 | 6/1974 | Mitchell | 524/406 |
| 3,845,001 | 10/1974 | Mitchell | 524/406 |
| 3,870,679 | 3/1975 | Mitchell | 524/406 |
| 3,900,441 | 8/1975 | King | 524/406 |
| 4,055,537 | 10/1977 | Kroenke | 524/406 |
| 4,786,662 | 11/1988 | De Berraly et al. | 524/406 |

OTHER PUBLICATIONS

Demetrius A. Kourtides et al., "Assessment of Relative Flammability and Thermochemical Properties of Some Dermoplastic Materials", Polymer Engineering and Science, (Aug. 1978), vol. 18, No. 11, pp. 855–860.

Kirk Othmer, Encyclopedia of Chemical Tech., 3rd Ed., vol. 15, 1981, "Molybdenum Compounds", pp. 683 to 692.

C. J. Hilado, "The Effect of Chemical and Physical Factors on Smoke Evolution from Polymers"—Flammability of Solid Plastics, vol. 7, Fire & Flammability Series, C. J. Hilado, editor, pp. 93–114, (1974). Technomic Pub. Co., Westport, Conn.

Primary Examiner—Veronica P. Hoke
Attorney, Agent, or Firm—Spencer & Frank

[57] ABSTRACT

Compositions based on vinylidene fluoride polymers which have a reduced smoke-generating capacity, comprising an effective amount of a molybdenum derivative, such as the molybdate of calcium, zinc or aluminium, as a smoke reducer.

The compositions are very particularly suitable for the manufacture of shaped articles used in building and in aeronautics.

6 Claims, No Drawings

COMPOSITIONS BASED ON VINYLIDENE FLUORIDE POLYMERS WHICH HAVE A REDUCED SMOKE-GENERATING CAPACITY

This application is a continuation of application Ser. No. 539,063, filed Oct. 4, 1983, now abandoned.

The present invention relates to compositions based on vinylidene fluoride polymers which have a reduced smoke-generating capacity.

Vinylidene fluoride polymers are difficult to ignite and self-extinguishing. It has already been proposed to incorporate into them, before they are processed, flame-retarding additives, such as certain specific tin compounds, in order to improve their ignition resistance further. Nevertheless, flame retarders have generally been shown to be incapable of totally preventing, at high temperatures, the combustion of shaped articles made of vinylidene fluoride polymers.

Furthermore, the reduction in the smoke-generating capacity, that is to say in the ability to generate smoke on combustion, and the ignition delay of a polymeric composition are two different phenomena which are not directly related to one another, so much so that some flame-retarding compounds act in certain cases as smoke generators once combustion has effectively started, or some smoke reducers induce in certain cases incandescence phenomena which promote ignition.

Hitherto, vinylidene fluoride polymers have had the reputation of having a low smoke-generating capacity. However, it has now been found that, in contrast to the generally held opinion, the combustion of shaped articles made of vinylidene fluoride polymers causes the emission of smoke in a sufficient amount to represent a disadvantage as serious as the flames themselves, insofar as it makes it more difficult to provide emergency assistance.

The object of the present invention, as characterised in the claims, is therefore to provide compositions based on vinylidene fluoride polymers which have a reduced smoke-generating capacity. The compositions according to the invention also have an increased ignition resistance, that is to say high limiting oxygen indices.

According to the invention, these compositions contain one or more molybdenum derivatives as smoke reducers. These derivatives can be organic or inorganic. The most effective, and those which are consequently preferred, are molybdenum derivatives in which the molybdenum is of valency 5 or 6. Examples of such derivatives which may be mentioned are molybdenyl acetylacetonate, molybdenum trioxide, molybdenum hydroxide of the general formula $MoO(OH)_3$, molybdenum halides and oxyhalides, such as molybdenum pentafluoride and hexafluoride, molybdenum pentachloride and molybdenyl chloride ($MoO_2Cl_2$), molybdic acid, metal or ammonium molybdates, phosphomolybdic acid and metal or ammonium phosphomolybdates.

The molybdenum derivatives which are particularly preferred are those in which the molybdenum is of valency 6. Amongst these, the metal molybdates are preferred. Examples of such metal molybdates which may be mentioned are the molybdates of sodium, bismuth, calcium, zinc, aluminium, iron and manganese.

Molybdenum derivatives which are very particularly preferred are the molybdates of calcium, zinc and aluminium, which have the advantages of being effective at low concentration and of not colouring the compositions, or not inducing coloration therein, especially during processing, and which are furthermore readily obtainable and inexpensive.

The manufacture of molybdenum derivatives is in itself well known and is described, in particular, in Kirk-Othmer, Encyclopedia of Chemical Technology, 3rd ed., 1981, Volume 15, pp 683 et seq.

In addition to the molybdenum derivative, the compositions according to the invention can contain any of the customary additives for vinylidene fluoride polymers, such as stabilisers, lubricants, fillers, pigments, flame retarders, polymeric additives and the like. In general, the compositions according to the invention contain at least 65% by weight of one or more vinylidene fluoride polymers and, most commonly, at least 80% by weight of such polymers.

The amount of molybdenum derivative present in the compositions according to the invention can vary within wide limits, especially according to the desired result and the nature of the molybdenum derivative used. Usually, the molybdenum derivative is used in an amount of 0.1 to 5 parts by weight, expressed as total molybdenum metal, per 100 parts of vinylidene fluoride polymer. It is preferably used in a total amount of 0.2 to 3.5 parts by weight, expressed as molybdenum metal, per 100 parts of polymer.

The term "vinylidene fluoride polymers" is understood as denoting all polymers containing at least 85 mol % and preferably at least 90 mol % of monomeric units derived from vinylidene fluoride. The vinylidene fluoride polymers which are suitable for preparing the compositions according to the invention therefore include both vinylidene fluoride homopolymers and its copolymers containing monomeric units derived from one or more comonomers. Particularly advantageous results are obtained with vinylidene fluoride polymers containing at least 90 mol % of monomeric units derived from vinylidene fluoride, any remainder preferably consisting of monomeric units derived from other fluorinated olefines such as vinyl fluoride, trifluoroethylene, chlorotrifluoroethylene, tetrafluoroethylene and hexafluoropropylene.

To prepare the compositions according to the invention, the molybdenum derivatives can be used in any form, for example as a powder or in aqueous dispersion. However, for reasons of convenience, it is preferably used in the form of a powder. In this case, it is advantageous to use a powder having an average particle size of less than about 200 microns. Preferably, the size is less than 100 microns and, more particularly, less than 50 microns.

The preparation of the compositions according to the invention does not present any particular problems, it being possible to use all the normal techniques for the preparation of these compositions. Thus, it is possible to mix the molybdenum derivatives with the vinylidene fluoride polymers as from the polymerisation stage, either by introducing it directly into the polymerisation medium at the end of polymerisation, or alternatively by adding it to the wet cake obtained by centrifuging or filtering the aqueous dispersion obtained after polymerisation. A particularly advantageous procedure consists in adding the molybdenum derivative to the vinylidene fluoride polymer in the form of a powder, during the manufacture of the premix, at the same time as the other additives forming part of the composition. It is also possible to introduce the molybdenum derivative directly into the apparatuses in which the vinylidene fluoride polymer is melted, such as the screw extruders.

The compositions according to the invention can be processed by any of the conventional processes for the shaping of thermoplastics. They are very particularly suitable for the manufacture of shaped articles intended for use in fields of application of vinylidene fluoride polymers where a substantial reduction in the smoke-generating capacity of the shaped articles is of particular interest, such as the building industry and the aeronautical industry (pipes, sleeves, films, paints).

The examples which follow illustrate the invention without however limiting it.

The formulations evaluated have the following composition, the amounts being expressed by weight:

| vinylidene fluoride polymer | 100 |
|---|---|
| polyethylene wax | 0.2 |
| molybdenum derivative | see Table I |

The molybdenum derivatives used are in the form of a powder having an average particle size of less than 50 microns.

In Examples 1 to 5, the polymer is a vinylidene fluoride homopolymer of trademark SOLEF and of type 2008, produced and marketed by SOLVAY & Cie. In Examples 6 to 10, the polymer is a vinylidene fluoride copolymer containing 5% by weight of monomeric units derived from a fluorinated olefine, of trademark SOLEF and of type 10510, also produced and marketed by SOLVAY & Cie.

Compositions 1 to 10 were prepared by mixing all the ingredients and kneading the mixture at 180° C. for 5 minutes, after which plates were produced by compressing the crepe at 180° C. for 2 minutes under a pressure of 100 kg/cm$^2$.

Plates were also prepared, under the same conditions, from formulations not containing molybdenum derivatives.

The smoke-generating capacity was evaluated on test-pieces cut out of the pressed plates, at 800° C., under an air flow of 300 liters/hour, according to Registered French Standard T51-073 of September 1977. Three test-pieces were cut out of each of the pressed plates, the mass of the test-pieces having been chosen, in the course of a preliminary test, so that the maximum optical density did not exceed 2.5 during the combustion test. All the test-pieces (Examples 1 to 10 and the formulations not containing molybdenum derivative) weighed 1,450 mg.

The curve of optical density as a function of time was recorded for each of the test-pieces. These curves were used to define the following:
the conventional unit for the amount of smoke, U, namely the amount of smoke corresponding to an optical density equal to 1 for a duration of 1 minute; and
the total amount of smoke emitted during the test, S, expressed in conventional units.

These data were used to calculate the smoke index F for each of the test-pieces, F being equal to S/m and m being the mass of the test-piece expressed in g, and the results were averaged over the three test-pieces.

The smoke reduction, expressed in %, was then calculated according to the formula:

$$F - F_o/F_o \times 100$$

in which:
F = average smoke index of the sample examined, and
P1 $F_o$ = average smoke index of a reference sample not containing molybdenum derivative.

The average smoke index $F_o$ of the formulation based on SOLEF 2008 homopolymer is 1.70. The average smoke index $F_o$ of the formulation based on SOLEF 10510 copolymer is 1.86.

The attached Table I collates the nature and the amount of molybdenum derivative used and also the smoke reduction for each composition, that is to say the smoke reduction, expressed in %, relative to the reference composition (not containing molybdenum derivative).

TABLE I

| EXAMPLE No. | MOLYBDENUM DERIVATIVE | | | SMOKE REDUCTION, % |
|---|---|---|---|---|
| | Nature | Amount in phr | in g of Mo/100 g of polymer** | |
| 1 | acetylacetonate | 2 | 0.59 | 70 |
| 2 | trioxide | 2 | 1.33 | 54 |
| 3 | molybdenyl chloride | 2 | 0.96 | 68 |
| 4 | phosphomolybdic acid | 6 | 3.06 | 76 |
| 5 | calcium phosphomolybdate | 2 | 1.22 | 69 |
| 6 | ammonium molybdate | 2 | 1.09 | 33 |
| 7 | sodium molybdate | 6 | 2.79 | 52 |
| 8 | zinc molybdate | 2 | 0.85 | 43 |
| 9 | calcium molybdate | 2 | 0.96 | 46 |
| 10 | aluminium molybdate | 2 | 0.78 | 41 |

*parts by weight per 100 parts of resin
**evaluated by atomic absorption photometry

I claim:
1. Vinylidene fluoride polymer composition, comprising:
at least 85 mole percent monomeric units derived from vinylidene fluoride and an effective amount of a smoke reducer consisting of a molybdate of calcium, zinc, or aluminum.

2. The composition according to claim 2, wherein the metal molybdate is used in an amount of 0.1 to 5 parts by weight, expressed as total molybdenum metal, per 100 parts of vinylidene fluoride polymers.

3. The composition according to claim 2, wherein the metal molybdate is used in an amount of 0.2 to 3.5 parts by weight, expressed as total molybdenum metal, per 100 parts of vinylidene fluoride polymers.

4. The composition according to claim 2, wherein the vinylidene fluoride polymer is a vinylidene fluoride homopolymer.

5. The composition according to claim 2, wherein the vinylidene fluoride polymer is a vinylidene fluoride copolymer containing at least 90 mol % of vinylidene fluoride.

6. The composition according to claim 3, containing 2 parts by weight metal molybdate and producing 60% or less of the smoke produced by the same polymer without the metal molybdate.

* * * * *